United States Patent
Lo et al.

(10) Patent No.: US 9,110,535 B2
(45) Date of Patent: Aug. 18, 2015

(54) TOUCH APPARATUS AND DRIVING METHOD THEREOF

(75) Inventors: Wen-Kai Lo, Miao-Li County (TW); Hsi-Yao Wu, Miao-Li County (TW); Ze-Yan Lin, Miao-Li County (TW)

(73) Assignees: INNOCOM TECHNOLOGY (SHENZHEN) CO., LTD., Shenzhen (CN); INNOLUX CORPORATION, Miao-Li County (TW)

( * ) Notice: Subject to any disclaimer, the term of this patent is extended or adjusted under 35 U.S.C. 154(b) by 266 days.

(21) Appl. No.: 13/610,973

(22) Filed: Sep. 12, 2012

(65) Prior Publication Data

US 2013/0113730 A1 May 9, 2013

(30) Foreign Application Priority Data

Nov. 4, 2011 (TW) ............................. 100140439 A (51) Int. Cl.
 *G06F 3/045* (2006.01)
 *G06F 3/041* (2006.01)
 *G06F 3/0488* (2013.01)
 *G06F 3/044* (2006.01)

(52) U.S. Cl.
 CPC .............. *G06F 3/0416* (2013.01); *G06F 3/044* (2013.01); *G06F 3/04886* (2013.01); *G06F 2203/04103* (2013.01)

(58) Field of Classification Search
 CPC ................ G06F 3/044; G06F 3/04886; G06F 2203/04103
 See application file for complete search history.

(56) References Cited

U.S. PATENT DOCUMENTS

| | | | | |
|---|---|---|---|---|
| 2011/0267304 A1* | 11/2011 | Simmons et al. | ............. | 345/174 |
| 2014/0055409 A1* | 2/2014 | Fisher et al. | ................. | 345/174 |
| 2014/0152324 A1* | 6/2014 | Schwartz et al. | ............. | 324/658 |

FOREIGN PATENT DOCUMENTS

CN 201853207 U 6/2011

* cited by examiner

*Primary Examiner* — Kumar Patel
*Assistant Examiner* — Randal Willis
(74) *Attorney, Agent, or Firm* — McClure, Qualey & Rodack, LLP (57) ABSTRACT

A touch apparatus includes a driving unit, a first touch panel, a second touch panel and a connecting circuit board coupling between the first and second touch panels. The driving unit has a driving element which has at least one driving port for outputting a plurality of driving signals and at least one sensing port for receiving a plurality of sensing signals. The first touch panel is coupled with the driving element. The second touch panel is disposed adjacent to the first touch panel, and is coupled with the driving element via the first touch panel. The first touch panel and the second touch panel are coupled jointly with at least one of the driving port and the sensing port. A driving method of the touch apparatus is also disclosed.

14 Claims, 9 Drawing Sheets

TOUCH APPARATUS AND DRIVING METHOD THEREOF

CROSS REFERENCE TO RELATED APPLICATIONS

This Non-provisional application claims priority under 35 U.S.C. §119(a) on Patent Application No(s). 100140439 filed in Taiwan, Republic of China on Nov. 4, 2011, the entire contents of which are hereby incorporated by reference.

BACKGROUND OF THE INVENTION

1. Field of Invention

The present invention relates to a touch apparatus and a driving method thereof, and in particular, to a touch apparatus with two touch panels and a driving method thereof.

2. Related Art

In the recent years, the touch apparatuses are widely applied to various kinds of applications. For example, the consuming electronic products, such as cell phones, laptops, PDAs, tablets, and MP3 players, are usually equipped with the touch apparatus as the friendlier human-machine interface. The most popular touch technologies include the resistive touch technology and the capacitive touch technology.

Figure 1:
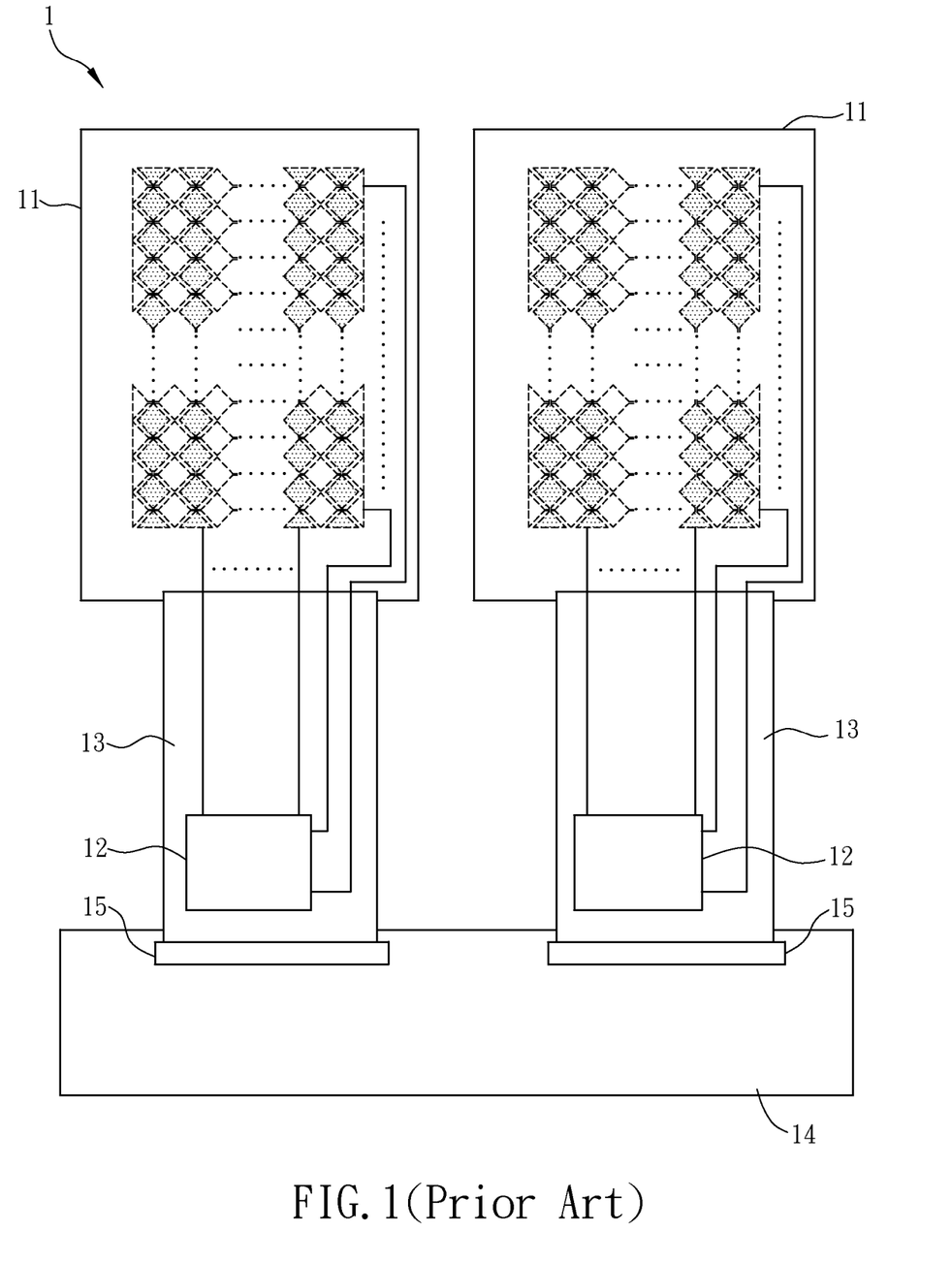
FIG. 1 is a schematic diagram showing a conventional touch apparatus.

FIG. 1 is a schematic diagram showing a conventional touch apparatus 1. The touch apparatus 1 includes two touch panels 11, two driving chips 12, two circuit boards 13, a system main circuit board 14, and two connectors 15. The circuit boards 13 are flexible circuit boards. One end of the circuit boards 13 is connected to the system main circuit board 14 through the corresponding connector 15, and the other end thereof is connected to the corresponding touch panel 11. The driving chips 12 are disposed on the circuit boards 13, respectively, so that the driving chips 12 can control the operations of the touch panels 11 through the circuit boards 13.

If the conventional touch apparatus 1 with two touch panels is applied to a display apparatus, the user may browse two pages at the same time and click to turn to next page, which is similar to the operation for reading a real book. The feature may encourage the customer to purchase the touch apparatus 1 with two touch panels. However, almost components of the touch apparatus 1 with two touch panels are twice of the conventional touch apparatus with a single touch panel, so that the cost for the touch apparatus 1 is sufficiently increased. Besides, the touch apparatus 1 must design larger space to accommodate the increased electronic components.

Therefore, it is an important subject of the present invention to provide a touch apparatus, especially a touch apparatus with two touch panels, which can minimize the space for accommodating the electronic components and sufficiently reduce the material and production costs.

SUMMARY OF THE INVENTION

In view of the foregoing, the present invention is to provide a touch apparatus that is configured with two touch panels and can reduce the material cost and the space for accommodating the electronic components, and a driving method thereof.

To achieve the above, the present invention discloses a touch apparatus comprising a driving unit, a first touch panel, a second touch panel, and a connecting circuit board electrically connected between the first and second touch panels. The driving unit has a driving element, which has at least one driving port for outputting a plurality of driving signals and at least one sensing port for receiving a plurality of sensing signals. The first touch panel is coupled with the driving element. The second touch panel is disposed adjacent to the first touch panel, and is coupled with the driving element via the first touch panel. The first touch panel and the second touch panel are coupled jointly with at least one of the driving port and the sensing port.

In one embodiment, the first touch panel and the second touch panel are coupled jointly with the sensing port and the driving port.

In one embodiment, the driving element has one driving port for jointly coupling the first and second touch panels and two sensing ports separately configured for the first and second touch panels respectively. In other words, the first and second touch panels connect to the sensing ports, respectively, and are coupled jointly with the driving port.

In one embodiment, the driving element has one sensing port for jointly coupling the first and second touch panels and two driving ports separately configured for the first and second touch panels respectively. In other words, the first and second touch panels connect to the driving ports, respectively, and are coupled jointly with the sensing port.

In one embodiment, the touch apparatus further comprises a difference generating unit disposed on the coupling route between the second touch panel and the driving element.

In addition, the present invention also discloses a driving method of a touch apparatus. The touch apparatus comprises a driving unit, a first touch panel, a second touch panel, and a connecting circuit board. The driving unit has a driving element having at least one driving port and at least one sensing port. The first touch panel and the second touch panel are coupled jointly with at least one of the driving port and the sensing port. The connecting circuit board is electrically connected between the first and second touch panels. The second touch panel is coupled with the driving element via the first touch panel. The driving method comprises the following steps of: outputting a plurality of driving signals from the driving port of the driving element; and receiving a first sensing signal group of the first touch panel and a second sensing signal group of the second touch panel by the sensing port, so as to determine a touch position. The touch apparatus further comprises a difference generating unit disposed between the first and second touch panels. The difference generating unit can control the signal scale of signals outputted from the first touch panel to be different from that outputted from the second touch panel. Accordingly, it is possible to determine whether the first touch panel or the second touch panel as well as the position are touched.

Compared with the conventional art, the touch apparatus of the present invention can use a single driving unit to achieve the controlling and driving of two screens, so that the space for accommodating the electronic components as well as the material cost can be reduced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The touch apparatus of the present invention can be applied to any electronic product with two screens, such as a cell phone, a laptop, a PDA, a GPS, a tablet, an e-paper, a MP3 player, or the likes.

Figure 2:
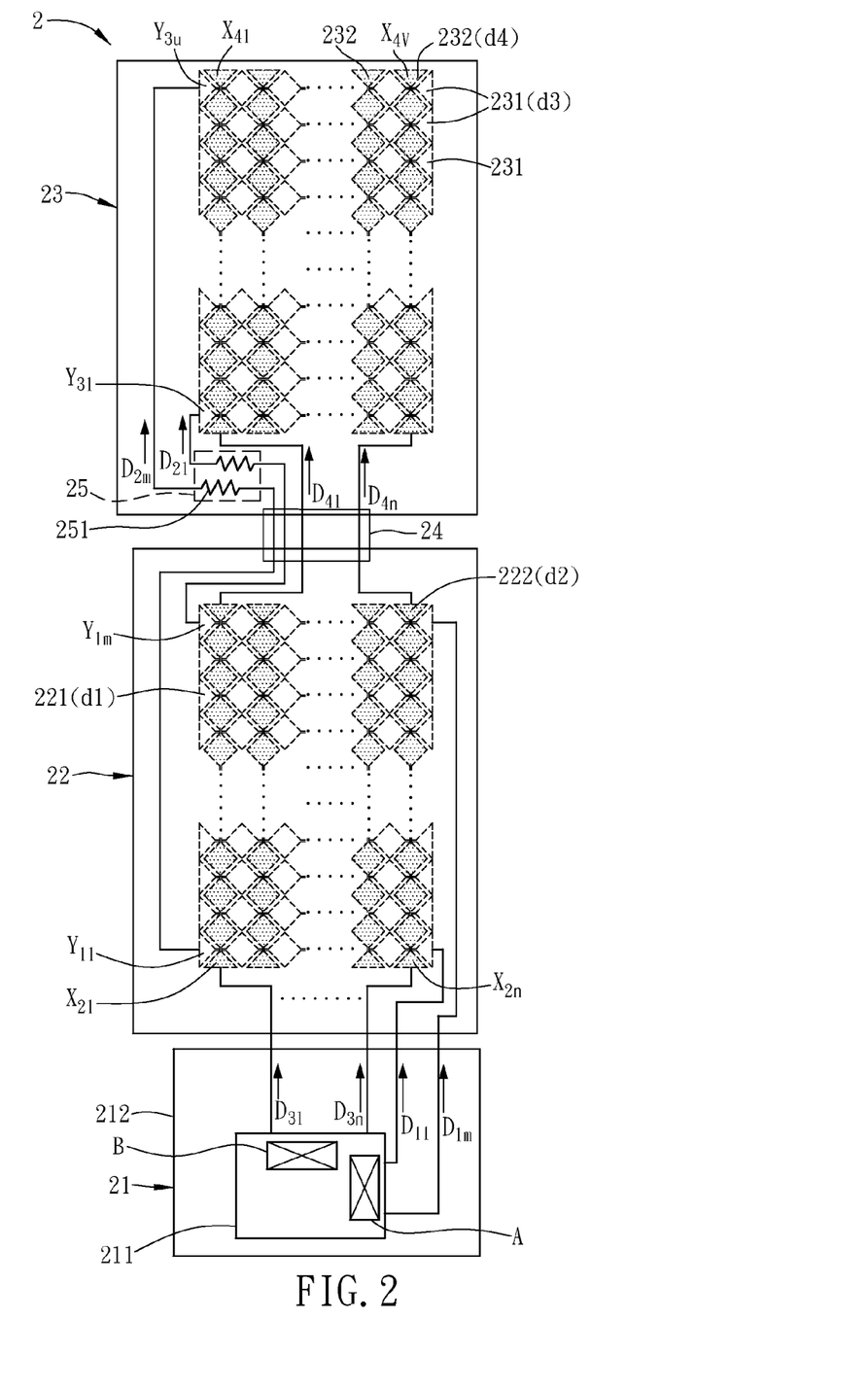
FIG. 2 is a schematic diagram of a touch apparatus according to a first embodiment of the present invention.

FIG. 2 is a schematic diagram of a touch apparatus 2 according to a first embodiment of the present invention. The touch apparatus 2 includes a driving unit 21, a first touch panel 22, a second touch panel 23, and a connecting circuit board 24. Each of the first touch panel 22 and the second touch panel 23 can be a resistive touch panel or a capacitive touch panel. In this embodiment, the first touch panel 22 and the second touch panel 23 are all capacitive touch panels for example.

The driving unit 21 has a driving element 211. In this embodiment, the driving element 211 is a driving chip, which is disposed on a circuit board 212 (e.g. a flexible circuit board). The circuit board 212 may be connected to a system main circuit board (not shown) via a connector (not shown). In this case, the driving unit 21 uses the driving element 211 to output the driving signal group and scan signal group to the first touch panel 22 and the second touch panel 23. The driving element 211 has at least one driving port A for outputting a plurality of driving signals and at least one sensing port B for outputting a plurality of scan signal group and receiving a plurality of sensing signals. The first touch panel 22 and the second touch panel 23 are coupled jointly with at least one of the driving port A and the sensing port B. For example, in this embodiment, the first touch panel 22 and the second touch panel 23 are coupled jointly with both of the driving port A and the sensing port B.

The first touch panel 22 is coupled with the driving element 211 directly. The first touch panel 22 comprises a plurality of first electrodes 221 and a plurality of second electrodes 222 for sensing a touch event on the first touch panel 22 executed by a user. Each of the first electrodes 221 is disposed extending along a first direction d1, and they are electrically insulated with each other. Similarly, each of the second electrodes 222 is disposed extending along a second direction d2, and they are electrically insulated with each other. In more specific, each first electrode 221 comprises a plurality of first sensing pads and a plurality of first bridge portions, and each first bridge portion is electrically connected between two adjacent first sensing pads. Each second electrode 222 comprises a plurality of second sensing pads and a plurality of second bridge portions, and each second bridge portion is electrically connected between two adjacent second sensing pads. Besides, the first direction d1 and the second direction d2 form an included angle such as 90 degrees, so that the first sending pads and the second sensing pads can configure a sensing array.

The second touch panel 23 is disposed adjacent to the first touch panel 22. In this embodiment, the second touch panel 23 is disposed at one side of the first touch panel 22 opposite to the driving unit 21. The second touch panel 23 is coupled with the first touch panel 22, and is further coupled with the driving element 211 indirectly via the first touch panel 22. The second touch panel 23 comprises a plurality of third electrodes 231 disposed in parallel along a third direction d3 and a plurality of fourth electrodes 232 disposed in parallel along a fourth direction d4. The third electrodes 231 and the fourth electrodes 232 have the sensing pads and bridge portions similar to those of the first electrodes 221 and the second electrodes 222 of the first touch panel 22, so the detailed descriptions thereof will be omitted. To be noted, the first direction d1 and the third direction d3 are substantially in parallel to each other, and the second direction d2 and the fourth direction d4 are substantially in parallel to each other.

In this embodiment, the third electrodes 231 are electrically connected with the driving element 211 through the first electrodes 221, and the fourth electrodes 232 are electrically connected with the driving element 211 through the second electrodes 222. As mentioned above, the first electrodes 221 are respectively connected to the third electrodes 231 in series, while the second electrodes 222 are respectively connected to the fourth electrodes 232 in series. Accordingly, the first electrodes 221 and the third electrodes 231 serially connected are clock synchronized, and/or the second electrodes 222 and the fourth electrodes 232 serially connected are clock synchronized. In this case, the number of the first electrodes 221 is the same as that of the third electrodes 231, so that the first electrodes 221 of the first touch panel 22 can correspond to the third electrodes 231 of the second touch panel 23 one by one. As shown in FIG. 2, there are totally m first electrodes 221 ($Y_{11}$ to $Y_{1m}$) and u third electrodes 231 ($Y_{31}$ to $Y_{3u}$). Herein, the first electrode $Y_{11}$ is electrically connected to the third electrode $Y_{3u}$ in series, the first electrode $Y_{1m}$ is electrically connected to the third electrode $Y_{31}$ in series, and the residual first electrodes and the residual third electrodes are connected to each other in series, respectively. Similarly, there are totally n second electrodes 222 ($X_{21}$ to $X_{2n}$) and v fourth electrodes 232 ($X_{41}$ to $X_{4v}$). Herein, the second electrode $X_{21}$ is electrically connected to the fourth electrode $X_{41}$ in series, the second electrode $X_{2n}$ is electrically connected to the fourth electrode $X_{4v}$ in series, and the residual second electrodes and the residual fourth electrodes are connected to each other in series, respectively.

The connecting circuit board 24 is electrically connected between the first touch panel 22 and the second touch panel 23, so that the second touch panel 23 is coupled with the driving element 211 via the first touch panel 22 and the connecting circuit board 24.

In this embodiment, the driving element 211 has a driving port A and a sensing port B. The first touch panel 22 and the second touch panel 23 are connected to the driving port A and the sensing port B and thus coupled jointly with the driving port A and the sensing port B. The driving port A has a number of channels that is equal to the electrode number of the first electrodes 221, the second electrodes 222, the third electrodes 231, or the fourth electrodes 232. Since the first electrodes 221, the second electrodes 222, the third electrodes 231, and the fourth electrodes 232 are coupled as mentioned above, the channel number of the driving port A should be equal to the largest one of the numbers of the first electrodes 221, the second electrodes 222, the third electrodes 231, and the fourth electrodes 232. In this embodiment, the numbers of the first electrodes 221, the second electrodes 222, the third electrodes 231, and the fourth electrodes 232 are equal, wherein there are m first electrodes 221, n second electrodes 222, and m is equal to n. That is, the channel number of the driving port A is equal to m or n. In addition, the sensing port B is coupled with the first electrodes 221 and the third electrodes 231 for example, so that the channel number of the sensing port B should be equal to the largest one of the numbers of the first electrodes 221 and the third electrodes 231. That is, the channel number of the sensing port B is equal to m or u.

The driving element 211 can separately output a first driving signal group $D_{11}$~$D_{1m}$ to the first electrodes $Y_{11}$~$Y_{1m}$ of the first touch panel 22 and a second driving signal group $D_{21}$~$D_{2m}$ to the third electrodes $Y_{31}$~$Y_{3u}$ of the second touch panel 23 within a unit time (e.g. 1/60 or 1/30 seconds, or a time period less than the period that the finger or stylus touches the panel). In this case, the driving port A outputs the first driving signal group $D_{11}$~$D_{1m}$ to the first electrodes $Y_{11}$~$Y_{1m}$ of the first touch panel 22 in sequence. For example, the driving port A may output the first driving signal group $D_{11}$ to the first electrode $Y_{11}$, the first driving signal group $D_{12}$ to the first electrode $Y_{12}$, and so on, thereby transmitting the first driving signal group $D_{11}$~$D_{1m}$ to the first electrodes $Y_{11}$~$Y_{1m}$ in sequence. Since the first touch panel 22 and the second touch panel 23 are connected in series, the driving port A can simultaneously output the first driving signal group $D_{11}$ to the first electrode $Y_{11}$ and the second driving signal group $D_{21}$ to the third electrode $Y_{31}$, simultaneously output the first driving signal group $D_{12}$ to the first electrode $Y_{12}$ and the second driving signal group $D_{22}$ to the third electrode $Y_{32}$, and so on, thereby transmitting the second driving signal group $D_{21}$~$D_{2m}$ to the third electrodes $Y_{31}$~$Y_{3u}$ in sequence.

In addition, the driving element 211 can further separately output a third driving signal group $D_{31}$~$D_{3n}$ to the second electrodes $X_{21}$~$X_{2n}$ of the first touch panel 22 and a fourth driving signal group $D_{41}$~$D_{4n}$ to the fourth electrodes $X_{41}$~$X_{4v}$ of the second touch panel 23. In this case, the driving port A outputs the third driving signal group $D_{31}$~$D_{3n}$ to the second electrodes $X_{21}$~$X_{2n}$ of the first touch panel 22 in sequence. For example, the driving port A may output the third driving signal group $D_{31}$ to the second electrode $X_{21}$, the third driving signal group $D_{32}$ to the second electrode $X_{22}$, and so on, thereby transmitting the third driving signal group $D_{31}$~$D_{3n}$ to the second electrodes $X_{21}$~$X_{2n}$. Since the first touch panel 22 and the second touch panel 23 are connected in series, the driving port A can simultaneously output the third driving signal group $D_{31}$ to the second electrode $X_{21}$ and the fourth driving signal group $D_{41}$ to the fourth electrode $X_{41}$, simultaneously output the third driving signal group $D_{32}$ to the second electrode $X_{22}$ and the fourth driving signal group $D_{42}$ to the fourth electrode $X_{42}$, and so on, thereby transmitting the fourth driving signal group $D_{41}$~$D_{4n}$ to the fourth electrodes $X_{41}$~$X_{4v}$.

After the electrodes on the first touch panel 22 and the second touch panel 23 are all driven, the first sensing signals from the first touch panel 22 and the second sensing signals from the second touch panel 23 according to the values or signals sensed by the electrodes are fed back to the sensing port B for determining a touch position.

In order to distinguish the first sensing signals from the first touch panel 22 and the second sensing signals from the second touch panel 23 in scales, the touch apparatus 2 may further include a difference generating unit 25 disposed on the coupling route between the second touch panel 23 and the driving element 211. In other words, the difference generating unit 25 is disposed on the coupling route between the second touch panel 23 and the driving unit 21. Accordingly, the difference generating unit 25 can be disposed on at least one of the driving unit 21, the first touch panel 22, the second touch panel 23, the connecting circuit board 24, and a system main circuit board (not shown). In this embodiment, the difference generating unit 25 is disposed on the second touch panel 23 for example. The difference generating unit 25 comprises a resistor, an amplifier, a plurality of resistors or a plurality of amplifiers, so that the single in before and after processed by the difference generating unit 25 can have obviously different in scale. This obviously different feature can be carried out by using the resistor(s) to weaken the signal or using the amplifier(s) to amplifying the signal. In this embodiment, the difference generating unit 25 has a plurality of resistors 251, which are arranged corresponding to the electrodes one by one.

In this embodiment, the first touch panel 22 and the second touch panel 23 are self-type touch panels. Since the second driving signal group $D_{21}$~$D_{2m}$ transmitted to the second touch panel 23 is processed by the difference generating unit 25, the first driving signal group $D_{11}$~$D_{1m}$ of the first touch panel 22 and the second driving signal group $D_{21}$~$D_{2m}$ of the second touch panel 23 are in different signal scales. Consequently, the first sensing signals and the second sensing signals obtained by directly sensing the driven electrodes are also in different signal scales. For example, the digital signal values of the first touch panel 22 may be larger or smaller than that of the second touch panel 23 so as to distinguish the first touch panel 22 from the second touch panel 23. In this embodiment, the digital signal values of the first touch panel 22 are larger than that of the second touch panel 23. For instance, the digital signal values from the first touch panel 22 is in the range from 4500 to 6000, while the digital signal values from the second touch panel 23 is in the range from 1500 to 3000, so that these signal values have obvious difference (about twice). Accordingly, when the digital signal value of the electrode that has been touched is 5800, it is easily determined that the first touch panel 22 is operated; otherwise, when the digital signal value of the electrode that has been touched is 2300, it is easily determined that the second touch panel 23 is operated.

Figure 3:
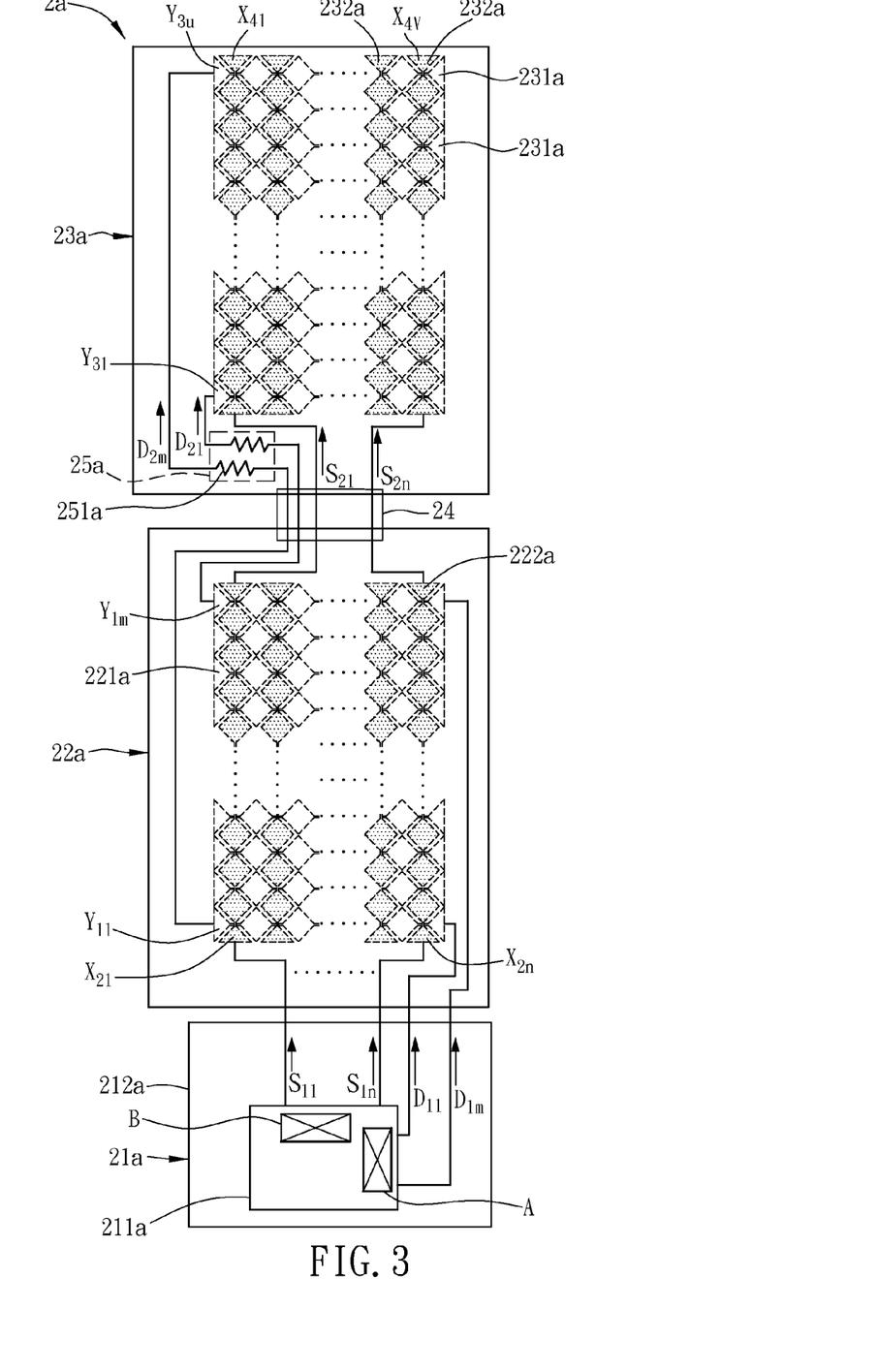
FIG. 3 is a schematic diagram of a touch apparatus according to a second embodiment of the present invention.

FIG. 3 is a schematic diagram of a touch apparatus 2a according to a second embodiment of the present invention. The driving element 211a of this embodiment also includes a driving port A and a sensing port B. The first touch panel 22a and the second touch panel 23a are connected to the driving port A and the sensing port B and thus coupled jointly with the driving port A and the sensing port B. In this embodiment, the driving port A has a number of channels that is equal to the electrode number of the first electrodes 221a or the third electrodes 231a. Since the first electrodes 221a and the third electrodes 231a are coupled with the driving port A, the channel number of the driving port A should be equal to the largest one of the numbers of the first electrodes 221a and the third electrodes 231a. That is, the channel number of the driving port A is equal to m or u. In addition, the sensing port B is coupled with the second electrodes 222a and the fourth electrodes 232a for example, so that the channel number of the sensing port B should be equal to the largest one of the numbers of the second electrodes 222a and the fourth electrodes 232a. Since the number of the second electrodes 222a is equal to that of the fourth electrodes 232a, the channel number of the sensing port B is equal to n or v.

The driving element 211a can separately output a first driving signal group $D_{11}$~$D_{1m}$ to the first electrodes $Y_{11}$~$Y_{1m}$ of the first touch panel 22a and a second driving signal group $D_{21}$~$D_{2m}$ to the third electrodes $Y_{31}$~$Y_{3u}$ of the second touch panel 23a within a unit time (e.g. 1/60 or 1/30 seconds, or a time period less than the period that the finger or stylus touches the panel). In this case, the driving port A outputs the first driving signal group $D_{11}$~$D_{1m}$ to the first electrodes $Y_{11}$~$Y_{1m}$ of the first touch panel 22 in sequence. For example, the driving port A may output the first driving signal group $D_{11}$ to the first electrode $Y_{11}$, the first driving signal group $D_{12}$ to the first electrode $Y_{12}$, and so on, thereby transmitting the first driving signal group $D_{11}$~$D_{1m}$ to the first electrodes $Y_{11}$~$Y_{1m}$ in sequence. Since the first touch panel 22a and the second touch panel 23a are connected in series, the driving port A can simultaneously output the first driving signal group $D_{11}$ to the first electrode $Y_{11}$ and the second driving signal group $D_{21}$ to the third electrode $Y_{31}$, simultaneously output the first driving signal group $D_{12}$ to the first electrode $Y_{12}$ and the second driving signal group $D_{22}$ to the third electrode $Y_{32}$, and so on, thereby transmitting the second driving signal group $D_{21}$~$D_{2m}$ to the third electrodes $Y_{31}$~$Y_{3u}$ in sequence. To be noted, the second $D_{21}$~$D_{2m}$ is transmitted to the second touch panel 23a through the difference generating unit 25a.

Different from the previous first embodiment, the first touch panel 22a and the second touch panel 23a of this embodiment are capacitive touch panels. In this case, when the driving port A outputs the first driving signal $D_{11}$ to the first electrode $Y_{11}$, the driving element 211a simultaneously outputs a first scan signal group $S_{11}$~$S_{1n}$ to the second electrodes $X_{21}$~$X_{2n}$ of the first touch panel 22a respectively and a second scan signal group $S_{21}$~$S_{2n}$ to the fourth electrodes $X_{41}$~$X_{4v}$ of the second touch panel 23a respectively via the sensing port B. The sensing port B can simultaneously output a scan signal or a plurality of scan signals to scan the second electrodes $X_{21}$~$X_{2n}$ or the fourth electrodes $X_{41}$~$X_{4v}$ so as to sense the touched position, and then the sensing signals are transmitted back to the sensing port B.

The first touch panel 22a and the second touch panel 23a then transmit the first sensing signal group and the second sensing signal group back to the sensing port B of the driving element 211a according to the values or signals sensed by the second electrodes $X_{21}$~$X_{2n}$ and the fourth electrodes $X_{41}$~$X_{4v}$ for determining a touch position.

In more specific, the difference generating unit 25a has a plurality of resistors 251a, and the second sensing signal group of the second touch panel 23a is processed by the difference generating unit 25a while the first sensing signal group of the first touch panel 22a is not. Thus, the second sensing signal group is obviously smaller than the first sensing group in signal scales, so that the sensing signals from the first touch panel 22a and the second touch panel 23a can be distinguished by the driving unit 21a, so as to determine the correct touched position.

When sensing the touch panels 22a and 23a, the driving element 211a of the driving unit 21 can simultaneously output a first driving signal group $D_{11}$~$D_{1m}$ to the first electrodes $Y_{11}$~$Y_{1m}$ of the first touch panel 22a. The first electrodes $Y_{11}$-$Y_{1m}$ are connected to the third electrodes $Y_{31}$~$Y_{3u}$ in series, respectively. Herein, the first electrode $Y_{11}$ is connected to the third electrode $Y_{3u}$ in series, and the first electrode $Y_{1m}$ is connected to the third electrode $Y_{31}$ in series. Since the resistors 251a of the difference generating unit 25a are disposed between the first electrodes $Y_{11}$~$Y_{1m}$ and the third electrodes $Y_{31}$~$Y_{3u}$, the second touch panel 23a can simultaneously receive the second driving signal group $D_{21}$~$D_{2m}$. The second driving signal group $D_{21}$~$D_{2m}$ and the first driving signal group $D_{11}$~$D_{1m}$ are in clock synchronization, but the second driving signal group $D_{21}$~$D_{2m}$ are weaker. When the first electrodes $Y_{11}$-$Y_{1m}$ and the third electrodes $Y_{31}$~$Y_{3u}$ are conducted in order (e.g. during a unit time), the driving element 211a only selects and conducts one of the second electrodes $X_{21}$~$X_{2n}$ during a unit time. For example, the sensing port B of the driving element 211a outputs the first scan signal group $S_{11}$~$S_{1n}$ to the second electrodes $X_{21}$~$X_{2n}$ of the first touch panel 22a in sequence, and the second scan signal group $S_{21}$~$S_{2n}$ to the fourth electrodes $X_{41}$~$X_{4v}$ of the second touch panel 23a in sequence. Because the fourth electrodes $X_{41}$~$X_{4v}$ of the second touch panel 23a are connected to the second electrodes $X_{21}$~$X_{2n}$ in series, respectively, wherein the second electrode $X_{21}$ is connected to the fourth electrode $X_{41}$ in series, and the second electrode $X_{2n}$ is connected to the fourth electrode $X_{4v}$ in series, the outputted first scan signal group $S_{11}$~$S_{1n}$ can not only enable the second electrodes $X_{21}$~$X_{2n}$ in order, but also enable the fourth electrodes $X_{41}$~$X_{4v}$ in order by the second scan signal group $S_{21}$~$S_{2n}$. Then, the sensing signals are transmitted back to the sensing port B.

The driving port A of the driving element 211a can respectively output the first driving signal group $D_{11}$~$D_{1m}$ to the first electrodes $Y_{11}$~$Y_{1m}$ of the first touch panel 22a and output the output the second driving signal group $D_{21}$~$D_{2m}$ to the third electrodes $Y_{31}$~$Y_{3u}$ of the second touch panel 23a. In this case, the second driving signal group $D_{21}$~$D_{2m}$ are transmitted to the second touch panel 23a through the difference generating unit 25a. Besides, the driving element 221a respectively outputs the first scan signal group $S_{11}$~$S_{1n}$ to the second electrodes $X_{21}$~$X_{2n}$ of the first touch panel 22a and outputs the second scan signal group $S_{21}$~$S_{2n}$ to the fourth electrodes $X_{41}$~$X_{4v}$ of the second touch panel 23a, and the sensing signals are transmitted back to the sensing port B.

The driving element 211a transmits the first driving signal group $D_{11}$~$D_{1m}$, the second driving signal group $D_{21}$~$D_{2m}$, the first scan signal group $S_{11}$~$S_{1n}$ and the second scan signal group $S_{21}$~$S_{2n}$ to the first touch panel 22a and the second touch panel 23a, so as to perform the scan sensing procedure of the first touch panel 22a and the second touch panel 23a. Finally, the sensing port B of the driving unit 21a receives a first sensing signal group from the first touch panel 22a and a second sensing signal group of the second touch panel 23a from the difference generating unit 25a, so as to determine a touched position.

Figure 4:
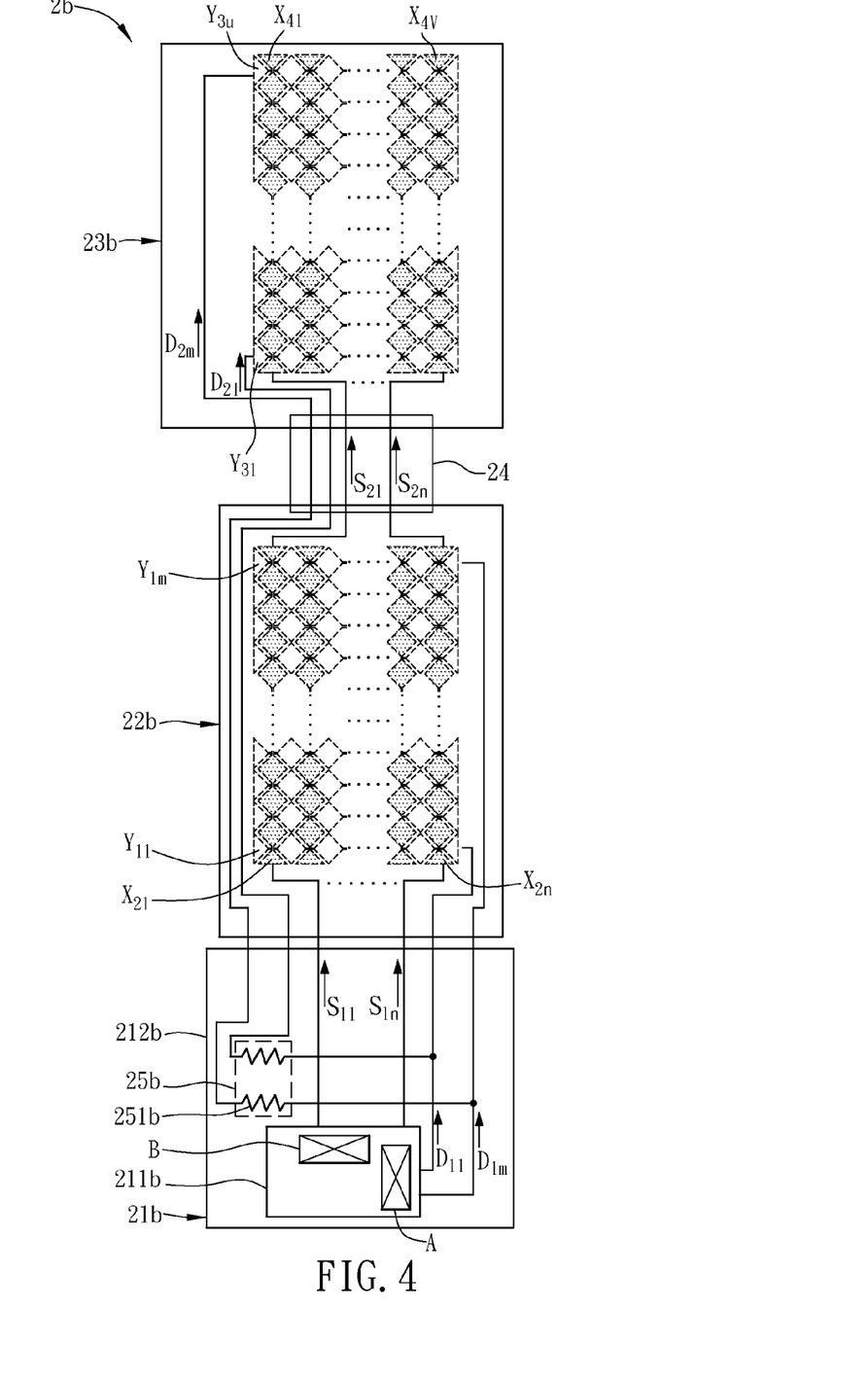
FIG. 4 is a schematic diagram of a touch apparatus according to a third embodiment of the present invention.

FIG. 4 is a schematic diagram of a touch apparatus 2b according to a third embodiment of the present invention. The driving element 211b of this embodiment also includes a driving port A and a sensing port B, and the first touch panel 22b and the second touch panel 23b are coupled jointly with the driving port A and the sensing port B. In the touch apparatus 2b, the third electrodes $Y_{31}$~$Y_{3u}$ of the second touch panel 23b are not connected to the first electrodes $Y_{11}$~$Y_{1m}$, but electrically connected to the driving element 211b directly. To be noted, the third electrodes $Y_{31}$~$Y_{3u}$ still need the traces of the first touch panel 22b for connecting with the driving element 211b. In other words, the third electrodes $Y_{31}$~$Y_{3u}$ of the second touch panel 23b are connected with the first electrodes $Y_{11}$~$Y_{1m}$ of the first touch panel 22b in parallel, while the fourth electrodes $X_{41}$~$X_{4V}$ of the second touch panel 23b are connected with the second electrodes $X_{21}$~$X_{2n}$ of the first touch panel 22b in series. To be noted, the first touch panel 22a/22b, the second touch panel 23a/23b and the connecting circuit board 24 of the touch apparatus 2a/2b are connected along an extension direction, which is substantially parallel to the second electrodes $X_{21}$~$X_{2n}$ and the fourth electrodes $X_{41}$~$X_{4v}$. Besides, in this embodiment, the electrodes of the first touch panel 22b and the electrodes of the second touch panel 23b are configured correspondingly one by one. Of course, the number of the electrodes of the first touch panel 22b may different from that of the second touch panel 23b. For example, if the first touch panel 22b has more electrodes, they can directly connect to the driving unit 21b by wires or traces; otherwise, if the second touch panel 23b has more electrodes, they can directly connect to the driving unit $21b$ by wires or traces. In addition, the difference generating unit $25b$ of the touch apparatus $2b$ is disposed in the driving unit $21b$, and is located on the coupling route between the third electrodes $Y_{31}$~$Y_{3u}$ of the second touch panel $23b$ and the driving element $211b$.

To be noted, the driving element $211b$ can output the driving signal group to the first electrodes $Y_{11}$~$Y_{1m}$ and second electrodes $X_{21}$~$X_{2n}$ of the first touch panel $22b$ and the third electrodes $Y_{31}$~$Y_{3u}$ and the fourth electrodes $X_{41}$~$X_{4v}$ of the second touch panel $23b$ through the driving port A.

In addition, the driving element $211b$ outputs a first driving signal group $D_{11}$~$D_{1m}$ to the first electrodes $Y_{11}$~$Y_{1m}$ of the first touch panel $22b$ respectively and a second driving signal group $D_{21}$~$D_{2m}$ to the third electrodes $Y_{31}$~$Y_{3u}$ of the second touch panel $23b$ respectively through the driving port A, and outputs a first scan signal group $S_{11}$~$S_{1n}$ to the second electrodes $X_{21}$~$X_{2n}$ of the first touch panel $22b$ respectively and a second scan signal group $S_{21}$~$S_{2n}$ to the fourth electrodes $X_{41}$~$X_{4v}$ of the second touch panel $23b$ respectively via the sensing port B.

To be noted, the second sensing signal group from the fourth electrodes $X_{41}$~$X_{4v}$ of the second touch panel $23b$ is transmitted to the driving unit $21b$ through the difference generating unit $25b$. Since the difference generating unit $25b$ includes a resistor, the second sensing signal group from the fourth electrodes $X_{41}$-$X_{4v}$ may have an obvious drop before and after the difference generating unit $25b$. After receiving the first and second sensing signal groups, the driving unit $21b$ can determine which one of the first touch panel $22b$ and the second touch panel $23b$ is touched according to the signal scale difference of the first and second sensing signal groups. Then the touched position can be obtained by proper calculation.

Figure 5:
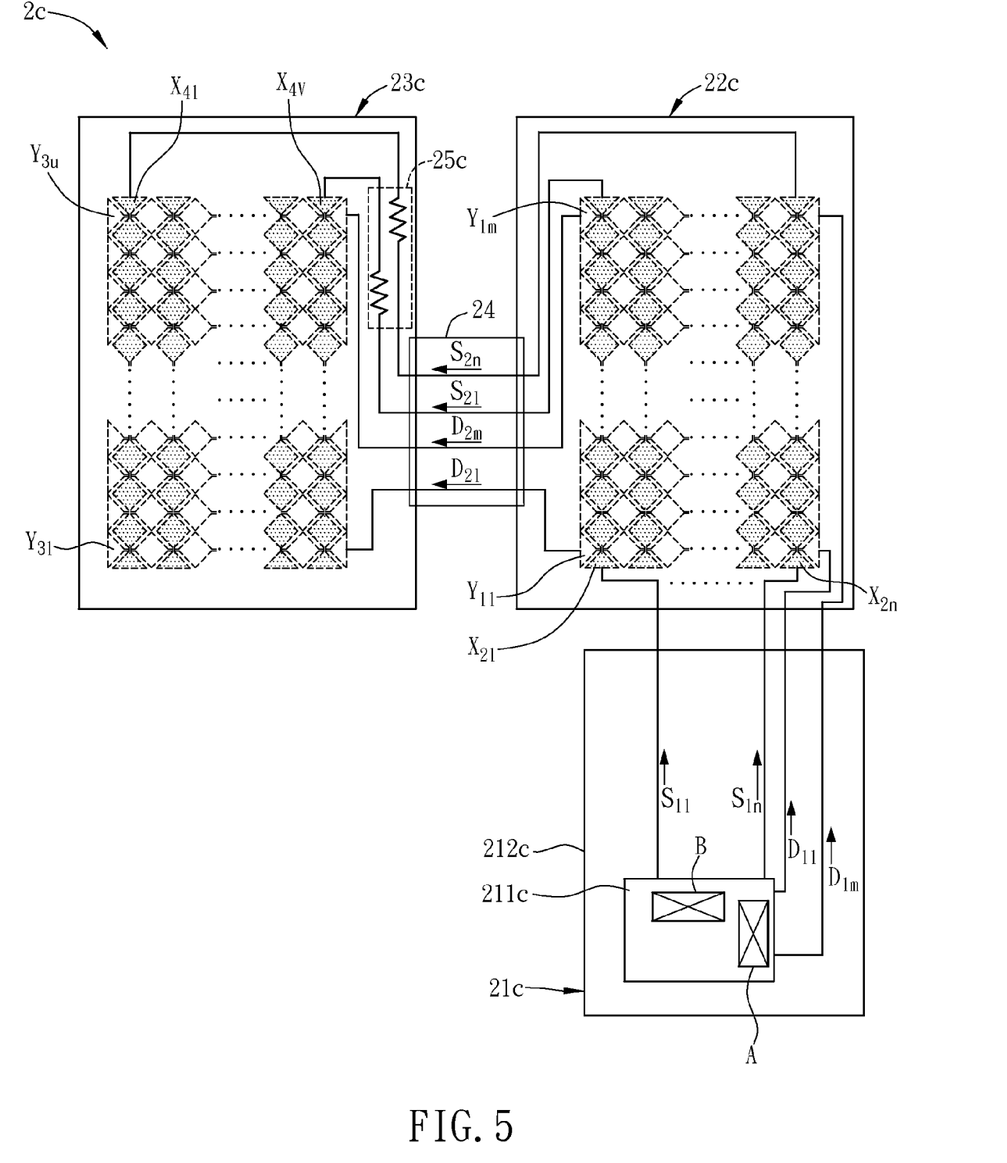
FIG. 5 is a schematic diagram of a touch apparatus according to a fourth embodiment of the present invention.

FIG. 5 is a schematic diagram of a touch apparatus $2c$ according to a fourth embodiment of the present invention. Different from the previous embodiments, the touch apparatus $2c$ includes difference generating units $25c$ disposed on the coupling routes from the driving unit $21c$ to the third electrodes $Y_{31}$~$Y_{3u}$ or the fourth electrodes $X_{41}$~$X_{4v}$ of the second touch panel $23c$. In this case, the difference generating units $25c$ are disposed on the second touch panel $23c$, and the fourth electrodes $X_{41}$~$X_{4v}$ are electrically connected to the driving element $211c$ through the difference generating units $25c$ and the second electrodes $X_{21}$~$X_{2n}$. In addition, the connection direction of the first touch panel $22c$ and the second touch panel $23c$ and the connection direction of the first touch panel $22c$ an the connection circuit board have an included angle, such as 90 degrees.

Figure 6:
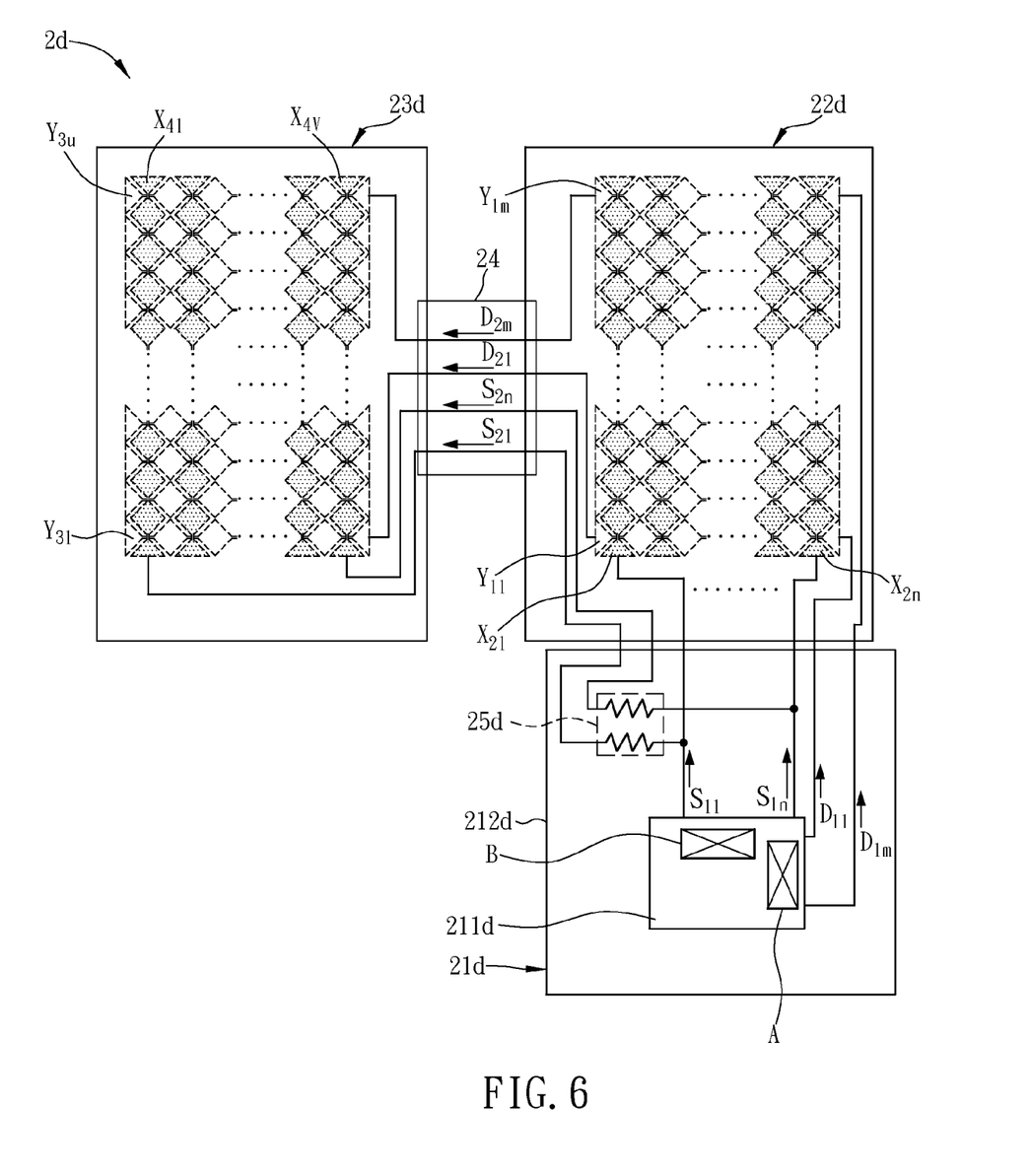
FIG. 6 is a schematic diagram of a touch apparatus according to a fifth embodiment of the present invention.

FIG. 6 is a schematic diagram of a touch apparatus $2d$ according to a fifth embodiment of the present invention. Different from the touch apparatus $2c$ of the previous embodiment, the difference generating units $25d$ of the touch apparatus $2d$ are disposed on the driving unit $21d$, and the third electrodes $Y_{31}$~$Y_{3u}$ or the fourth electrodes $X_{41}$~$X_{4v}$ of the second touch panel $23d$ may electrically connected with the driving element $211d$ directly through the difference generating units $25d$. In addition, the third electrodes $Y_{31}$~$Y_{3u}$ and the fourth electrodes $X_{41}$~$X_{4v}$ of the second touch panel $23d$ are electrically connected with the first electrodes $Y_{11}$~$Y_{1m}$ and the second electrodes $X_{21}$~$X_{2n}$ of the first touch panel $22d$ in series or in parallel.

Figure 7:
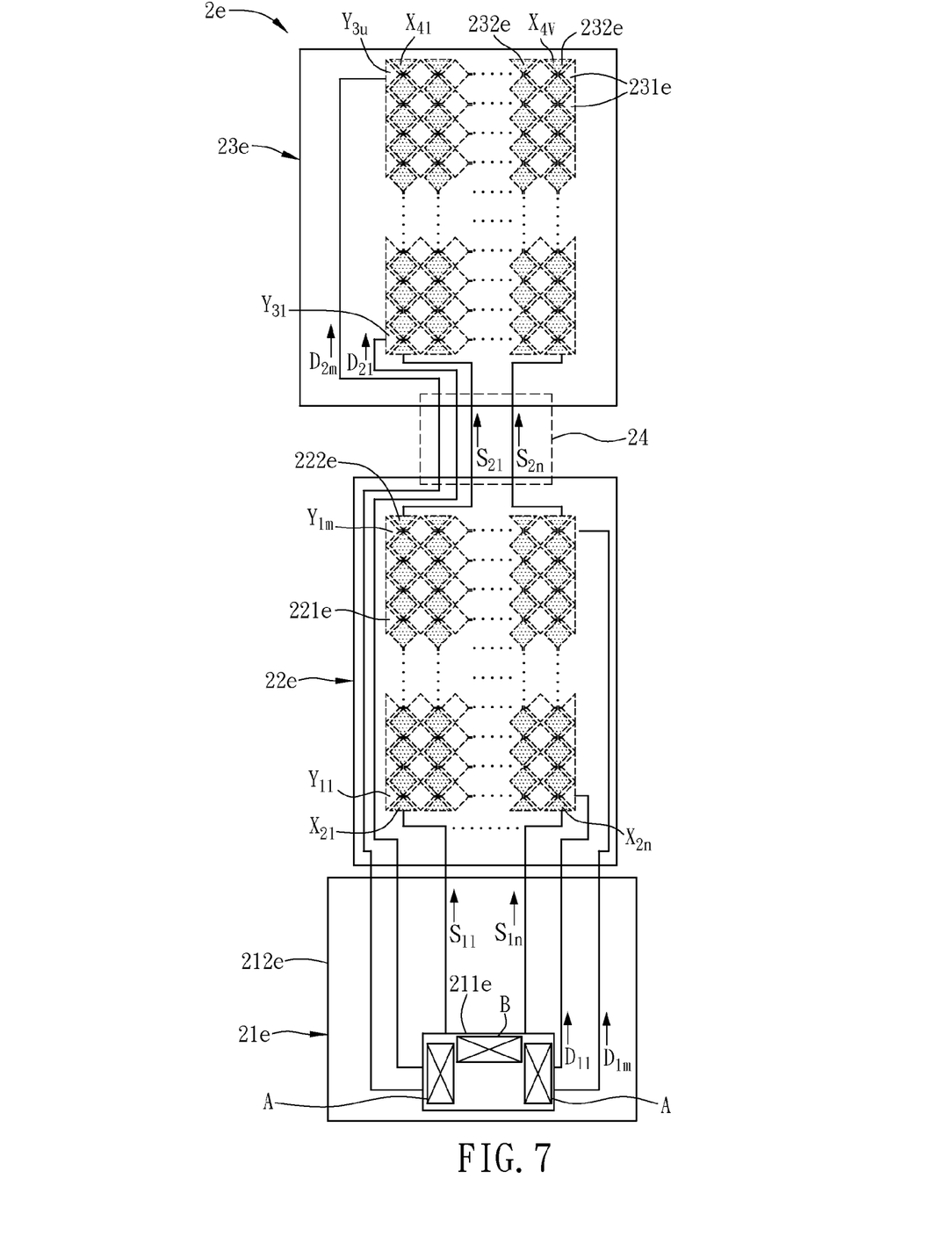
FIG. 7 is a schematic diagram of a touch apparatus according to a sixth embodiment of the present invention.

FIG. 7 is a schematic diagram of a touch apparatus $2e$ according to a sixth embodiment of the present invention. Different from the touch apparatus $2a$ of FIG. 3, the touch apparatus $2e$ is not configured with any difference generating unit, and the driving element $211e$ has two driving ports A and a sensing port B for example. Herein, the first touch panel $22e$ and the second touch panel $23e$ are coupled jointly with the sensing port B but without the driving ports A. That is, the first touch panel $22e$ and the second touch panel $23e$ are separately connected to driving ports A and both connected to the single sensing port B. Besides, the third electrodes $Y_{31}$~$Y_{3u}$ have independent traces for directly connecting with the driving element $211e$. Two driving ports A are coupled with the first electrodes $221e$ and the third electrodes $231e$ respectively, so that one driving port A has m channels, and the other one has u channels. The sensing port B is coupled with the second electrodes $222e$ and the fourth electrodes $232e$, so that the channel number of the sensing port B is equal to the number of largest one of the second electrodes $222e$ and the fourth electrodes $232e$. Thus, the channel number of the sensing port B is n or v.

The driving element $211e$ outputs a first driving signal group $D_{11}$~$D_{1m}$ to the first electrodes $Y_{11}$~$Y_{1m}$ of the first touch panel $22e$ through one driving port A, and a second driving signal group $D_{21}$~$D_{2m}$ to the third electrodes $Y_{31}$~$Y_{3u}$ of the second touch panel $23e$ through another driving port A. By internal configurations of two driving ports A, the first driving signal group $D_{11}$~$D_{1m}$ and the second driving signal group $D_{21}$~$D_{2m}$ are different in signal scales. For example, the signal scale of the first driving signal group $D_{11}$~$D_{1m}$ may be larger than or smaller than that of the second driving signal group $D_{21}$~$D_{2m}$, so that it is obviously to distinguish the signals to be transmitted to the first touch panel $22e$ from the signals to be transmitted to the second touch panel $23e$. In addition, two driving ports A can simultaneously output the first driving signal group $D_{11}$~$D_{1m}$ to the first touch panel $22e$ and output the second driving signal group $D_{21}$~$D_{2m}$ to the second touch panel $23e$.

During the sensing procedure of the touch panels 223 and $23e$, the driving element $211e$ can enable the second electrodes $X_{21}$~$X_{2n}$ in sequence. In more details, only one of the second electrodes $X_{21}$~$X_{2n}$ is selected within an unit time so as to individually sense the signal values of all second electrodes $X_{21}$~$X_{2n}$ to determine the touch event. For example, the driving element $211e$ sequentially enables the second electrodes $X_{21}$~$X_{2n}$ that output the first scan signal group $S_{11}$~$S_{1n}$ to the first touch panel $22e$ and the fourth electrodes $X_{41}$~$X_{4v}$ that output the second scan signal group $S_{21}$~$S_{2n}$ to the second touch panel $23e$. Because the fourth electrodes $X_{41}$~$X_{4v}$ of the second touch panel $23e$ are connected to the second electrodes $X_{21}$~$X_{2n}$ in series, respectively, wherein the second electrode $X_{21}$ is connected to the fourth electrode $X_{41}$ in series, and the second electrode $X_{2n}$ is connected to the fourth electrode $X_{4v}$ in series, the outputted first scan signal group $S_{11}$~$S_{1n}$ can not only enable the second electrodes $X_{21}$~$X_{2n}$ in order, but also enable the fourth electrodes $X_{41}$~$X_{4v}$ in order by the second scan signal group $S_{21}$~$S_{2n}$ so as to perform the signal sensing procedure. Herein, the signal scales of the first scan signal group $S_{11}$~$S_{1n}$ and the second scan signal group $S_{21}$~$S_{2n}$ are substantially the same.

The driving element $211e$ can convert the analog voltage or current values sensed according to the first sensing signals of the first touch panel $22e$ and the second sensing signals of the second touch panel $23e$ into digital signal values. Because the signal scales of the first driving signal group $D_{11}$~$D_{1m}$ and the second driving signal group $D_{21}$~$D_{2m}$ are different, the first sensing signals and the second sensing signals are also different in signal scales. In this case, the digital signal values of the first touch panel $22e$ may be larger than or smaller than those of the second touch panel $23e$, thereby distinguishing the first touch panel $22e$ from the second touch panel $23e$.

Figure 8:
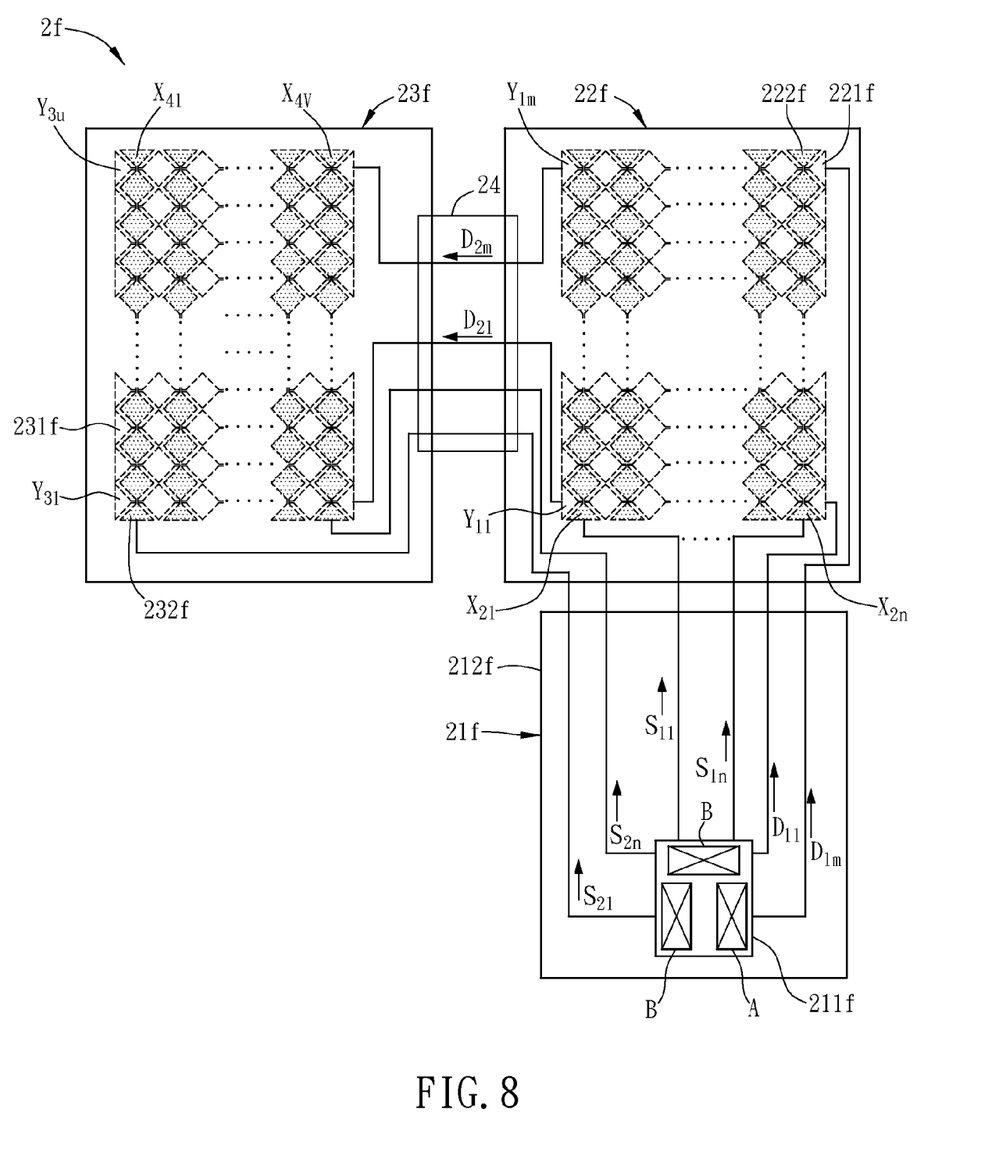
FIG. 8 is a schematic diagram of a touch apparatus according to a seventh embodiment of the present invention.

FIG. 8 is a schematic diagram of a touch apparatus $2f$ according to a seventh embodiment of the present invention. Different from the touch apparatus $2c$ of FIG. 5, the touch apparatus $2f$ is not configured with any difference generating unit, and the driving element $211f$ has a driving port A and two sensing ports B for example. Herein, the first touch panel $22f$ and the second touch panel $23f$ are coupled jointly with the driving port A but without the sensing ports B. That is, the first touch panel $22f$ and the second touch panel $23f$ are separately connected to sensing ports B and both connected to the single driving port A. Besides, the fourth electrodes $232f$ have independent traces for directly connecting with the driving element $211f$. The driving port A is coupled with the first electrodes $221f$ and the third electrodes $231f$, so that the channel number of the driving port A is equal to the number of largest one of the first electrodes $221f$ and the third electrodes $231f$. Thus, the channel number of the driving port A is m or u. In addition, one sensing port B is coupled with the second electrodes $222f$, and the other sensing port B is coupled with the fourth electrodes $232f$. Thus, one of the sensing ports B has n channels, and the other one has v channels.

The driving element $211f$ outputs a first driving signal group $D_{11} \sim D_{1m}$ to the first touch panel $22f$ and a second driving signal group $D_{21} \sim D_{2m}$ to the second touch panel $23f$ through the driving port A. Since the first touch panel $22f$ and the second touch panel $23f$ are connected in series, the second driving signal group $D_{21} \sim D_{2m}$ and the first driving signal group $D_{11} \sim D_{1m}$ are in clock synchronization, and the signal scales of the first driving signal group $D_{11} \sim D_{1m}$ and the second driving signal group $D_{21} \sim D_{2m}$ are substantially the same.

The sensing ports B of the driving element $211f$ can respectively output the first scan signal group $S_{11} \sim S_{1n}$ to the first touch panel $22f$ and output a second scan signal group $S_{21} \sim S_{2n}$ to the second touch panel $23f$ respectively, thereby obviously distinguishing the signals to be transmitted to the first touch panel $22f$ from the signals to be transmitted to the second touch panel $23f$. In this case, the driving element $211f$ can simultaneously or continuously output the first scan signal group $S_{11} \sim S_{1n}$ and the second scan signal group $S_{21} \sim S_{2n}$ within a unit time.

In addition, the driving element $211f$ can determine the touch position according to the sensed values of the first and second sensing signals. By internal configurations of the driving element $221f$, the first scan signal group $S_{11} \sim S_{1n}$ and the second scan signal group $S_{21} \sim S_{2n}$, which are different in scales, can be transmitted to the first touch panel $22f$ and the second touch panel $23f$, respectively. Accordingly, when the first sensing signal group from the first touch panel $22f$ and the second sensing signal group from the second touch panel $23f$ are transmitted back to two sensing ports B of the driving element $221f$, respectively, the driving unit $21f$ can determine which one of the first touch panel $22f$ and the second touch panel $23f$ is touched and the actual touch position based on the obtained values or signals from the first touch panel $22f$ and the second touch panel $23f$.

Figure 9:
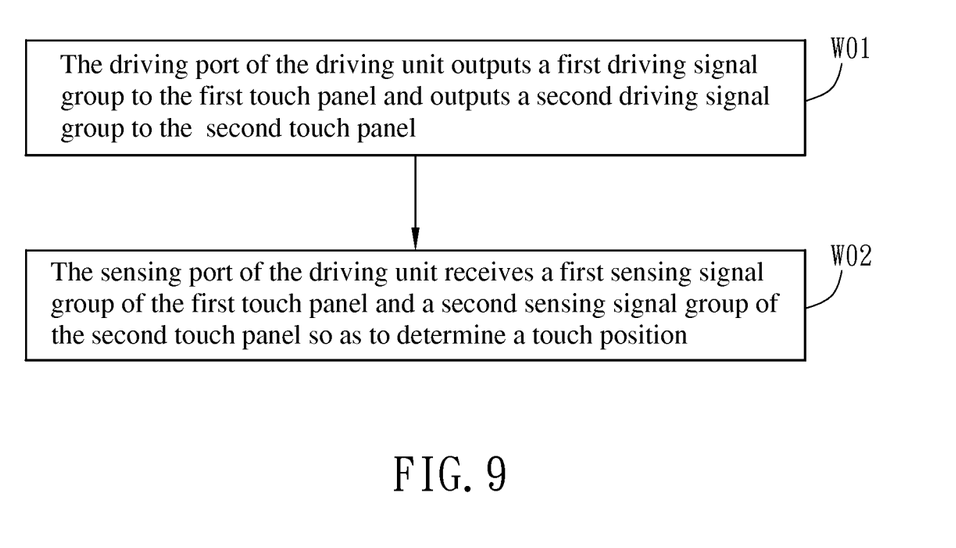
FIG. 9 is a flow chart of a driving method of a touch apparatus of the present invention.

The structures of the touch apparatuses $2$, $2a$, $2b$, $2c$, $2d$, $2e$ and $2f$ are described hereinbefore, and the driving method for any of them will be illustrated hereinafter. Most of the procedures of the driving method have been described in the above embodiments, so the following illustration only mentions the important points. FIG. 9 is a flow chart of a driving method of a touch apparatus of the present invention. Referring to FIG. 9, the driving method of a touch apparatus includes the following steps of: outputting a plurality of driving signals from the driving port of the driving unit (step W01); and receiving a first sensing signal group of the first touch panel and a second sensing signal group of the second touch panel by the sensing port, so as to determine a touch position (step W02).

Referring to FIG. 9 in view of FIG. 2, in the step W01, a plurality of driving signals are divided into the first driving signal group $D_{11} \sim D_{1m}$ to be outputted to the first touch panel $22$ and the second driving signal group $D_{21} \sim D_{2m}$ to be outputted to the second touch panel $23$. In more details, the driving port A of the driving unit $21$ outputs the first driving signal group $D_{11} \sim D_{1m}$ to the first electrodes $Y_{11} \sim Y_{1m}$ of the first touch panel $22$ and outputs the second driving signal group $D_{21} \sim D_{2m}$ to the third electrodes $Y_{31} \sim Y_{3u}$ of the second touch panel $23$ within an unit time.

Then, the driving port A of the driving unit $21$ further outputs the third driving signal group $D_{31} \sim D_{3n}$ to the second electrodes $X_{21} \sim X_{2n}$ of the first touch panel $22$ and outputs the fourth driving signal group $D_{41} \sim D_{4n}$ to the fourth electrodes $X_{41} \sim X_{4v}$ of the second touch panel $23$.

In the step W02, the sensing port B of the driving unit $21$ receives the first sensing signal group of the first touch panel $22$ and the second sensing signal group of the second touch panel $23$, so as to determine a touch position. To be noted, the difference generating unit $25$ is disposed on the coupling route between the second touch panel $23$ and the driving unit $21$. Accordingly, the second sensing signal group is transmitted through the difference generating unit $25$, so that the signal scale of the second sensing signal group is different from that of the first sensing signal group. Therefore, according to the configuration of the difference generating unit $25$, the driving unit $21$ senses the signals of the first touch panel $22$ and the second touch panel $23$ so as to determine the touch position.

The driving element $211$ can convert the analog voltage or current values of the first sensing signal group and the second sensing signal group into digital signal values. The driving unit $21$ then determines the touch position and the touched panel according to the converted digital signal values.

Referring to FIG. 9 in view of FIG. 3, after the step W02, the driving method of the touch apparatus $2a$ further comprises a step as follow. The sensing port B of the driving unit $21a$ outputs a first scan signal group $S_{11} \sim S_{1n}$ to the second electrodes $X_{21} \sim X_{2n}$ of the first touch panel $22a$, and outputs a second scan signal group $S_{21} \sim S_{2n}$ to the fourth electrodes $X_{41} \sim X_{4v}$ of the second touch panel $23a$. In addition, the difference generating unit $25a$ is disposed between the first touch panel $22a$ and the second touch panel $23a$ and is located o the route of the driving signal groups. The detailed driving procedures have been described in the above embodiments, so the related descriptions will be omitted here.

Finally, the step W02 is performed to receive the first sensing signal group of the first touch panel $22a$ and the second sensing signal group of the second touch panel $23a$ by the sensing port B, so as to determine a touch position. Since the second driving signal group $D_{21} \sim D_{2m}$ is transmitted to the second touch panel $23a$ through the difference generating unit $25a$, so that the signal scales of the second driving signal group $D_{21} \sim D_{2m}$ and the first driving signal group $D_{11} \sim D_{1m}$ are obviously different from each other. Thus, the first sensing signal group and the second sensing signal group received by the sensing port B of the driving element $211a$ also have obvious difference.

Referring to FIG. 9 in view of FIG. 5, the difference generating unit $25c$ is disposed between the first touch panel $22c$ and the second touch panel $23c$ and is located o the route of the scan signal groups, so that the signal scale of the first scan signal group $S_{11} \sim S_{1n}$ is different from that of the second scan signal group $S_{21} \sim S_{2n}$. Accordingly, the first sensing signal group and the second sensing signal group received by the sensing port B of the driving element 211c also have obvious difference.

Referring to FIG. 9 in view of FIG. 7, the touch apparatus 2e is not configured with any difference generating unit, and the driving unit 21e has two driving ports A and a sensing port B.

In the step W01, one driving port A of the driving unit 21e outputs a first driving signal group $D_{11}$~$D_{1m}$ to the first touch panel 22e in sequence, and the other driving port A outputs a second driving signal group $D_{21}$~$D_{2m}$ to the second touch panel 23e in sequence. After that, the sensing port B outputs a first scan signal group $S_{11}$~$S_{1n}$ to the second electrodes $X_{21}$~$X_{2n}$ of the first touch panel 22e and outputs a second scan signal group $S_{21}$~$S_{2n}$ to the fourth electrodes $X_{41}$~$X_{4v}$ of the second touch panel 23e in sequence.

In the step W02, the sensing port B of the driving unit 21e receives a first sensing signal group of the first touch panel 22e and a second sensing signal group of the second touch panel 23e, so as to determine a touch position. Since the first driving signal group $D_{11}$~$D_{1m}$ and the second driving signal group $D_{21}$~$D_{2m}$ are respectively transmitted to the first touch panel 22e and the second touch panel 23e through two driving ports A, it is possible to use the driving ports A to adjust the signal scales of the first driving signal group $D_{11}$~$D_{1m}$ and the second driving signal group $D_{21}$~$D_{2m}$ to be different from each other.

Referring to FIG. 9 in view of FIG. 8, the driving unit 21e of the touch apparatus 2f has a driving port A and two sensing ports B.

In the step W01, the driving port A of the driving unit 21f outputs a first driving signal group $D_{11}$~$D_{1m}$ to the first electrodes $Y_{11}$~$Y_{1m}$ of the first touch panel 22f and outputs a second driving signal group $D_{21}$~$D_{2m}$ to the third electrodes $Y_{31}$~$Y_{3u}$ of the second touch panel 23f within an unit time.

After that, one sensing port B of the driving unit 21f outputs a first scan signal group $S_{11}$~$S_{1n}$ to the second electrodes $X_{21}$~$X_{2n}$ of the first touch panel 22f, and the other sensing port B outputs a second scan signal group $S_{21}$~$S_{2n}$ to the fourth electrodes $X_{41}$~$X_{4v}$ of the second touch panel 23f.

Finally, in the step W02, one sensing port B of the driving unit 21f receives the first sensing signal group of the first touch panel 22f, and the other sensing port B receives the second sensing signal group of the second touch panel 23f, so as to distinguish the first touch panel 22f or the second touch panel 23f. Then, the touch position can be determined according to the values or signals of the first and second sensing signal groups.

In summary, the touch apparatus of the present invention has at least one driving port and at least one sensing port. In different embodiments, the driving element may have two driving ports and one sensing port (the first and second touch panels are coupled jointly with the sensing port and without the driving ports), have one driving port and two sensing ports (the first and second touch panels are coupled jointly with the driving port and without the sensing ports), or have one driving port and one sensing port (the first and second touch panels are coupled jointly with the driving port and the sensing port). The driving element can output driving signal groups of different signal scales to different touch panels through the driving ports, so that it can determine which touch panel is operated as well as the touch position according to the values or signals of the sensing signal groups.

In addition, the touch apparatus of the present invention further comprises a difference generating unit disposed between the first and second touch panels. The difference generating unit can provide the signal scale difference between of the signals outputted from the first and second touch panels. Accordingly, it is possible to determine whether the first touch panel or the second touch panel as well as the touch position according to the values of the first and second sensing signal groups. Compared with the conventional art, the touch apparatus of the present invention can use a single driving unit to achieve the controlling and driving of two screens, so that the space for accommodating the electronic components as well as the material cost can be reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch apparatus, comprising:
   a driving unit having a driving element, wherein the driving element has at least one driving port for outputting a plurality of driving signals and at least one sensing port for receiving a plurality of sensing signals;
   a first touch panel coupled with the driving element;
   a second touch panel disposed adjacent to the first touch panel, wherein the first touch panel and the second touch panel are coupled jointly with the sensing port and the driving port;
   a connecting circuit board electrically connected between the first touch panel and the second touch panel, so that the second touch panel is coupled with the driving element via the first touch panel; and
   a difference generating unit disposed on the coupling route between the second touch panel and the driving element;
   wherein, the first touch panel and the second touch panel are coupled jointly with at least one of the driving port and the sensing port.

2. The touch apparatus of claim 1, wherein the first touch panel and the second touch panel are coupled jointly with the driving port but without the sensing port.

3. The touch apparatus of claim 2, wherein the number of the sensing ports is 2.

4. The touch apparatus of claim 1, wherein the first touch panel and the second touch panel are coupled jointly with the sensing port but without the driving port.

5. The touch apparatus of claim 4, wherein the number of the driving ports is 2.

6. The touch apparatus of claim 1, wherein the difference generating unit comprises a plurality of resistors or a plurality of amplifiers.

7. The touch apparatus of claim 1, wherein the difference generating unit is disposed on at least one of the driving unit, the first touch panel, the second touch panel, the connecting circuit board, and a system main circuit board.

8. The touch apparatus of claim 1, wherein the connecting circuit board is flexible circuit board.

9. The touch apparatus of claim 1, wherein the first touch panel comprises a plurality of first electrodes disposed in parallel along a first direction and a plurality of second electrodes disposed in parallel along a second direction, the second touch panel comprises a plurality of third electrodes disposed in parallel along a third direction and a plurality of fourth electrodes disposed in parallel along a fourth direction, the third electrodes are electrically connected with the driving element via the first electrodes, and the fourth electrodes are electrically connected with the driving element via the second electrodes.

10. The touch apparatus of claim 9, wherein the first direction and the third direction are substantially the same, the second direction and the fourth direction are substantially the same, the first electrodes and the third electrodes are clock synchronized, and/or the second electrodes and the fourth electrodes are clock synchronized.

11. A driving method of a touch apparatus, the touch apparatus comprising a driving unit, a first touch panel, a second touch panel, and a connecting circuit board, the driving unit having a driving element having at least one driving port and at least one sensing port, the first touch panel and the second touch panel coupled jointly with at least one of the driving port and the sensing port, the connecting circuit board electrically connected between the first touch panel and the second touch panel, the second touch panel coupled with the driving element via the first touch panel, and the driving method comprising the steps of:

outputting a plurality of driving signals from the driving port of the driving element; and receiving a first sensing signal group of the first touch panel and a second sensing signal group of the second touch panel by the sensing port;

wherein, the signal scale of the second sensing signal group is different from that of the first sensing signal group so as to determine a touch position, wherein the driving port outputs a first driving signal group to the first touch panel and a second driving signal group to the second touch panel, the second driving signal group is transmitted to the second touch panel via a difference generating unit, and the difference generating unit controls the signal scale of driving signals transmitted to the first touch panel to be different from that of driving signals transmitted to the second touch panel.

12. The driving method of claim 11, wherein the sensing port outputs a first scan signal group to the first touch panel and a second scan signal group to the second touch panel, and the second scan signal group is transmitted to the second touch panel via a difference generating unit.

13. The driving method of claim 11, wherein the driving element has two driving ports, one of the driving ports outputs a first driving signal group to the first touch panel, and the other one of the driving ports outputs a second driving signal group to the second touch panel.

14. The driving method of claim 11, wherein the driving element has two sensing ports, one of the sensing ports outputs a first scan signal group to the first touch panel, and the other one of the sensing ports outputs a second scan signal group to the second touch panel.

* * * * *